(No Model.)
J. W. RAPP.
BUILDING BLOCK.
No. 599,864. Patented Mar. 1, 1898.
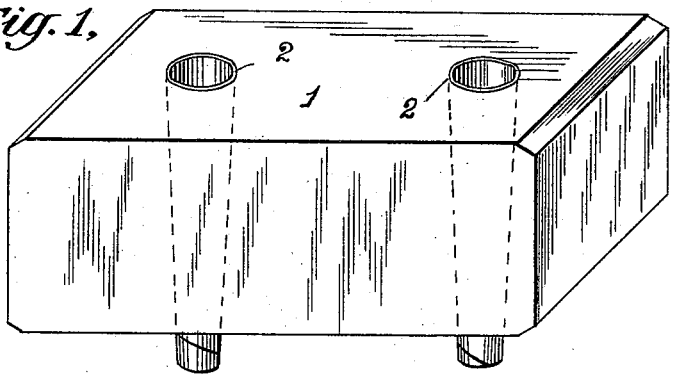
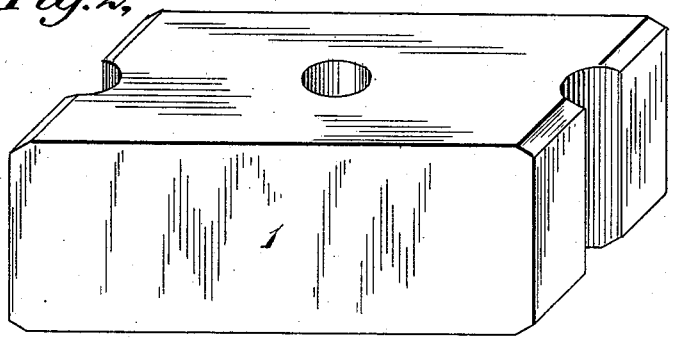
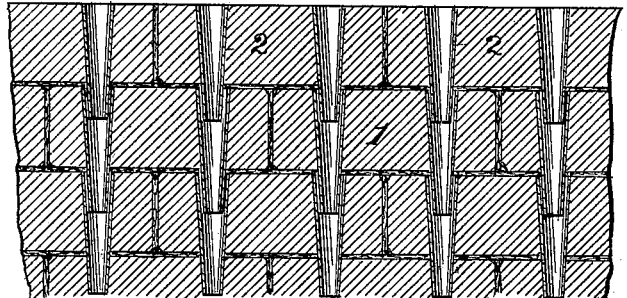
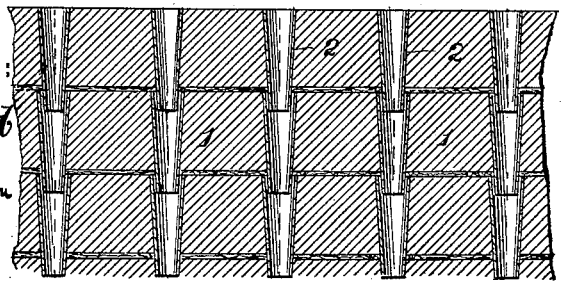
WITNESSES:
INVENTOR
John W. Rapp
BY
Edwin H. Brown
ATTORNEY

UNITED STATES PATENT OFFICE.

JOHN W. RAPP, OF NEW YORK, N. Y.

BUILDING-BLOCK.

SPECIFICATION forming part of Letters Patent No. 599,864, dated March 1, 1898.

Application filed December 18, 1896. Serial No. 616,228. (No model.)

*To all whom it may concern:*

Be it known that I, JOHN W. RAPP, of the city, county, and State of New York, have invented a new and useful Improvement in Building-Blocks, of which the following is a specification, reference being had to the drawings accompanying and forming a part of the same.

My invention relates to building-blocks, and has for its object to provide a block which may be used for flooring, ceiling, or partition work, and is so constructed as to effect a great economy in the cost of the material and in the labor necessary for making the construction specified.

With this object in view I have designed a block which I will describe by referring to the drawings accompanying this specification.

In said drawings, Figure 1 represents my building-block in perspective. Fig. 2 is a modified form of the same, also shown in perspective. Fig. 3 is a sectional view of a wall or partition made up of my improved building-blocks. Fig. 4 is a similar view of a partition made with blocks similar to that shown in Fig. 2. Fig. 5 is a detailed view of the engaging tube.

Like symbols of reference refer to like parts throughout the several views of the drawings.

Referring to the drawings in detail, 1 represents a building-block made in accordance with my invention, and 2 2 are the tubes. These tubes are cone-shaped and are formed of metal spirally wound upon itself, the spiral seams being secured in any desired way, as by welding, brazing, or soldering. I prefer forming the tube with a spiral seam, for the reason that the seam has a screw action when in use in the block; but it will be understood that any other form of tube might be used. These tubes are cone-shaped, the wider part being flush with the top of the building-block and the narrow end of the tube projecting a short distance below the block, so as to fit into the upper portion of the tube in the block below.

In making the blocks I make the plastic material of any desired substance and mold the blocks in comparatively large sizes. I may either place the tubes in the plastic material and allow the plastic material to harden about the tubes or I may place a core instead of the tube in position in the block, so as to leave a suitably-shaped hole through the block for the reception of the tube, which may be inserted after the block has hardened.

In the view shown in Fig. 2 one-half of a tube-receiving hole is made at each end of the block and another in the middle. The hole in the middle may receive the tube during the process of formation, or the tube may be inserted afterward, as above specified; but the end holes 3 3 are designed to receive the tubes after the blocks have been placed in position to form a wall or partition.

It will be seen that the holes and tubes in one block register with the holes and tubes of the blocks above and below the same when the blocks are in position in a structure, so as to form a continuous tube passing through a series of blocks and fastening the same together. For additional security I may, if desired, pour down the tubes some cementing material, as plaster-of-paris or the like, to permanently secure the blocks together; also, I form the blocks with cut-off corners, so that when the plaster is applied to the face of the blocks some of the plaster will pass down between the interstices formed by these cut-off corners and aid in maintaining the stability of the structure.

What is claimed as new is—

1. A building-block, provided with a tapered opening extending therethrough, and a separate tube or tubes adapted to fit in said tapered opening and to project through one side of the block to engage with a correspondingly-tapered opening or tube in a contiguous block, substantially as specified.

2. A building-block provided with a cone-shaped spirally-wound tube or tubes secured in said block and projecting through one side thereof to engage with a contiguous block, substantially as specified.

In testimony whereof I have signed my name to this specification in the presence of two subscribing witnesses.

JOHN W. RAPP.

Witnesses:
ERNEST HOPKINSON,
W. LAIRD GOLDSBOROUGH.